UNITED STATES PATENT OFFICE.

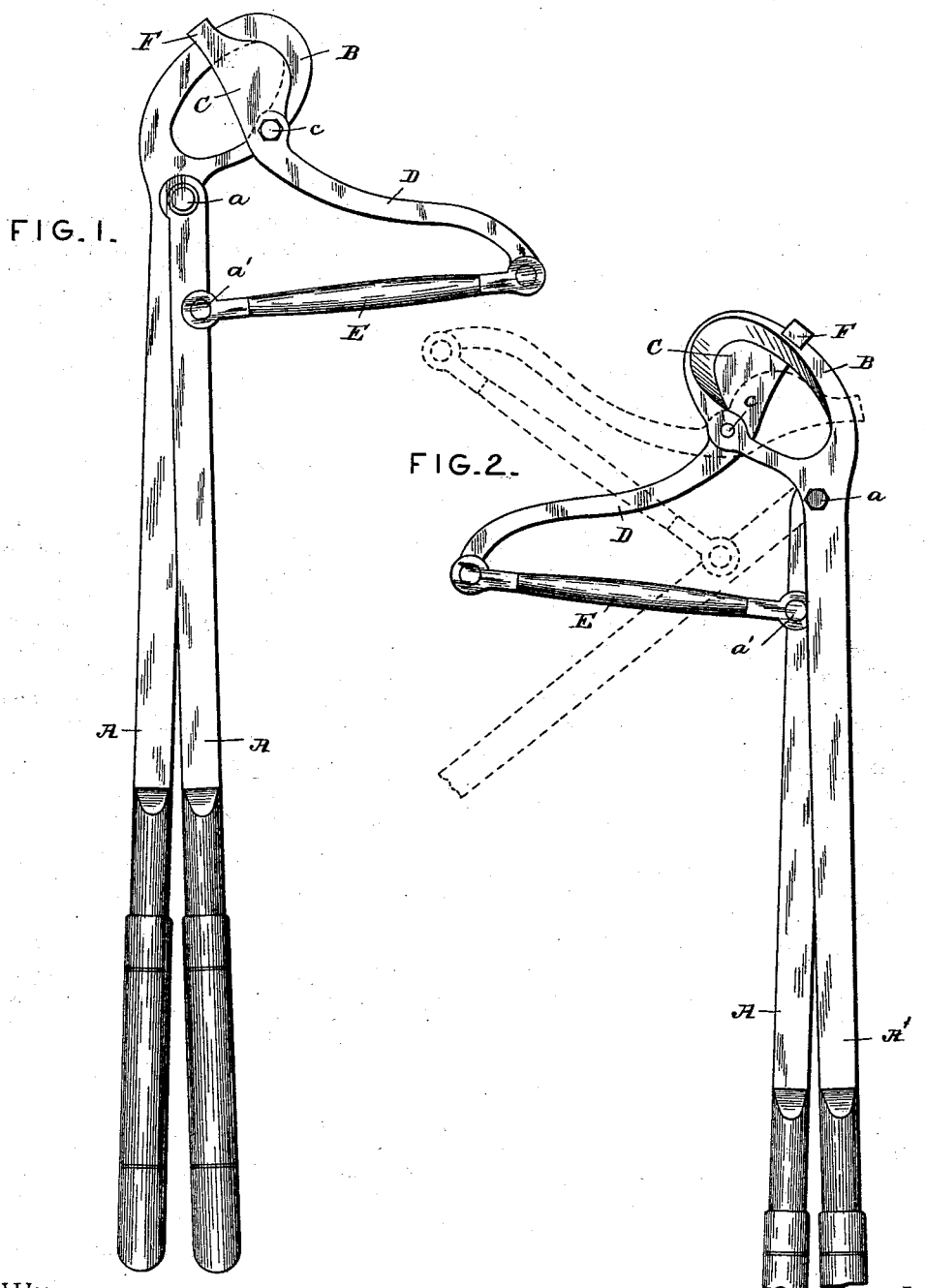

VINCENT B. BROWN, JOHN IMEL, AND DAVID J. WHITAKER, OF EMERSON, IOWA.

CATTLE-DEHORNER.

SPECIFICATION forming part of Letters Patent No. 507,967, dated October 31, 1893.

Application filed June 15, 1892. Serial No. 436,851. (No model.)

*To all whom it may concern:*

Be it known that we, VINCENT B. BROWN, JOHN IMEL, and DAVID J. WHITAKER, citizens in the United States, residing at Emerson, in the county of Mills and State of Iowa, have invented a new and useful Cattle-Dehorner, of which the following is a specification.

Our invention relates to an improvement of dehorners for cattle, and it is our object to provide an instrument which will sever the horn with as little exertion to the operator as possible, and which will make a clean, positive cut without unnecessary pain to the cattle. We attain this object by a construction and arrangement of parts, the essential feature of which is a double knife, the members of which are carried, respectively, by the two handles of the tool, said members being arranged to attack opposite sides of the horn, simultaneously, a slight drawing action of the edges being accomplished to facilitate the operation of the knife.

The construction by which we attain the above object is fully described, in detail, in connection with the accompanying drawings, wherein—

Figure 1 is a side view of a dehorner embodying our invention. Fig. 2 is a similar view showing the reverse side of the tool, the position of the blades, when open, being indicated in dotted lines.

A A' represent the handles of the improved dehorner, fulcrumed together at $a$, the handle A being provided at its extremity, beyond the fulcrum, with a loop-blade, B, the interior edge of which is sharpened to an edge, as shown. The swinging blade, C, is fulcrumed to one side of the loop-blade, at the point, $c$, and is provided with a curved arm, D, the extremity of which is connected by a rod, E, to an intermediate point of the handle, A', near its fulcrum, as at the point, $a'$. The loop-blade is elongated, or elliptical in shape, the swinging blade being fulcrumed to one of the longer sides, thereof, and the opposite long side of the loop-blade is curved concentrically with the fulcrum, $c$, whereby the guide-loop, F, which is formed on the extremity of the swinging blade and is fitted around or engaged with the said curved side of the loop-blade, follows the latter through-out its movement. The elliptical shape of the loop-blade, combined with the fact that the swinging blade is convex in contour and is fulcrumed to the long side of the former, causes a drawing, or sliding, movement of the cutting edges as the knife is closed, this action being calculated to sever the horn with less exertion to the operator and less pain to the subject. It will be seen, furthermore, that the leverage attained by the peculiar arrangement of the parts, is a substantial aid in the operation of the instrument; namely, the swinging blade is provided with a long, curved arm which is connected to the handle near its fulcrum, thus giving a double leverage. The arm of the swinging blade is curved downwardly toward its extremity to enable the parts to operate without interference and without locking.

Having thus described our invention, what we claim, and desire to secure by Letters Patent, is—

In a cattle dehorning implement, a handle A provided at its outer end with an integral loop blade B which is set at an angle to the handle, a swinging blade C pivotally attached to the inner side of the blade B and having its outer end bent over forming an integral guide hook F which clasps the outer curved side of the loop blade, the blade C beyond its pivot being extended to form a long curved arm D, a rod E pivotally connected to the outer end of the arm, and a handle A' pivoted to the handle A below the pivotal point of the blade C and above the pivotal point of the rod E with the arm D, said handle A' having the inner end of the rod E pivotally connected therewith, all combined and operating, substantially as described.

In testimony that we claim the foregoing as our own we have hereto affixed our signatures in the presence of two witnesses.

VINCENT B. BROWN.
JOHN IMEL.
DAVID J. WHITAKER.

Witnesses:
R. M. SHIPMAN,
A. L. SHELDON.